Dec. 28, 1954 V. I. DUDLEY 2,698,104
MINE HAULAGE VEHICLE
Filed Oct. 27, 1950 6 Sheets-Sheet 1
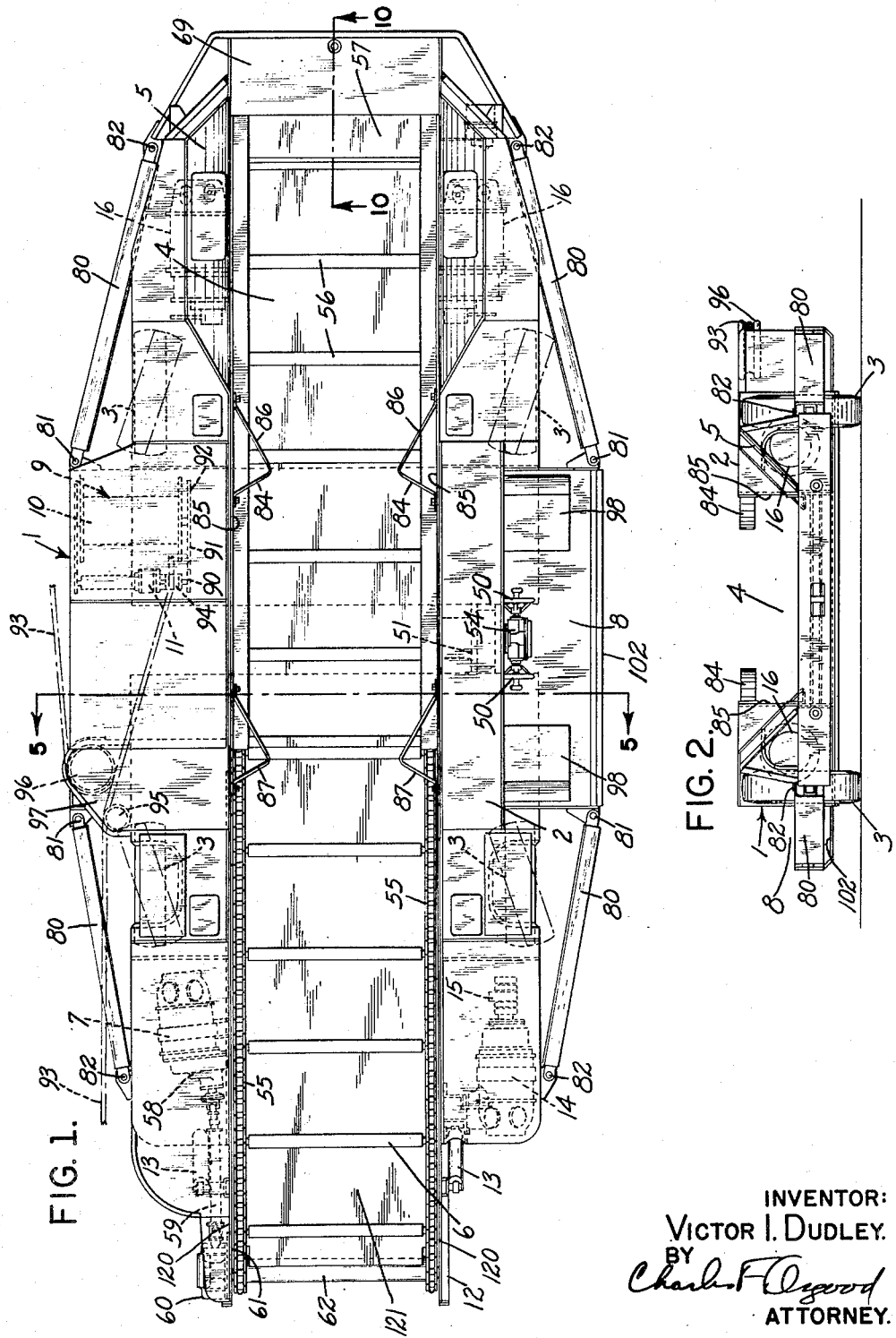
INVENTOR:
VICTOR I. DUDLEY.
BY
Charles F. Osgood
ATTORNEY.

Dec. 28, 1954 V. I. DUDLEY 2,698,104
MINE HAULAGE VEHICLE
Filed Oct. 27, 1950 6 Sheets-Sheet 2

INVENTOR:
VICTOR I. DUDLEY.
BY
Charles F. Osgood,
ATTORNEY.

Dec. 28, 1954  V. I. DUDLEY  2,698,104
MINE HAULAGE VEHICLE
Filed Oct. 27, 1950  6 Sheets-Sheet 3
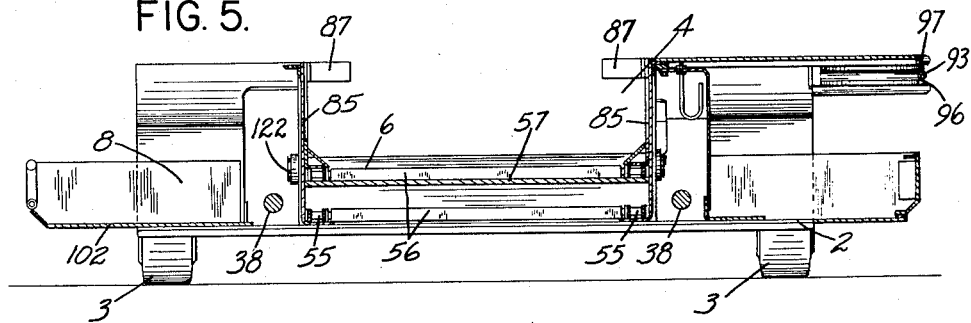
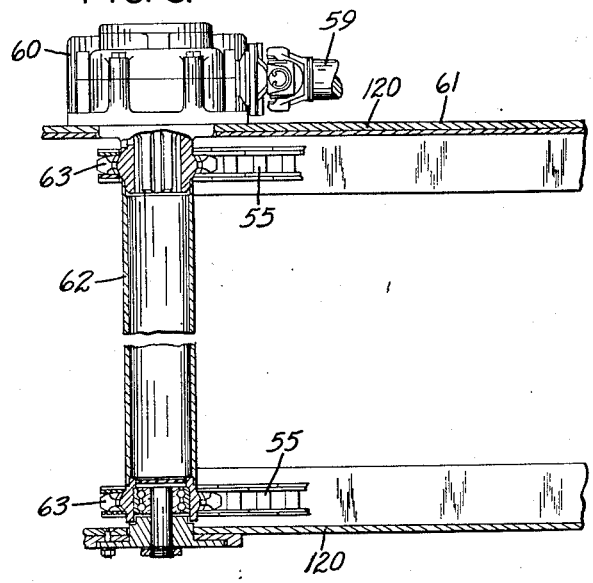
INVENTOR:
VICTOR I. DUDLEY.
BY
Charles F. Osgood
ATTORNEY.

Dec. 28, 1954  V. I. DUDLEY  2,698,104
MINE HAULAGE VEHICLE
Filed Oct. 27, 1950  6 Sheets-Sheet 4

INVENTOR:
VICTOR I. DUDLEY.
BY
Charles F. Osgood,
ATTORNEY.

Dec. 28, 1954  V. I. DUDLEY  2,698,104
MINE HAULAGE VEHICLE
Filed Oct. 27, 1950  6 Sheets-Sheet 5
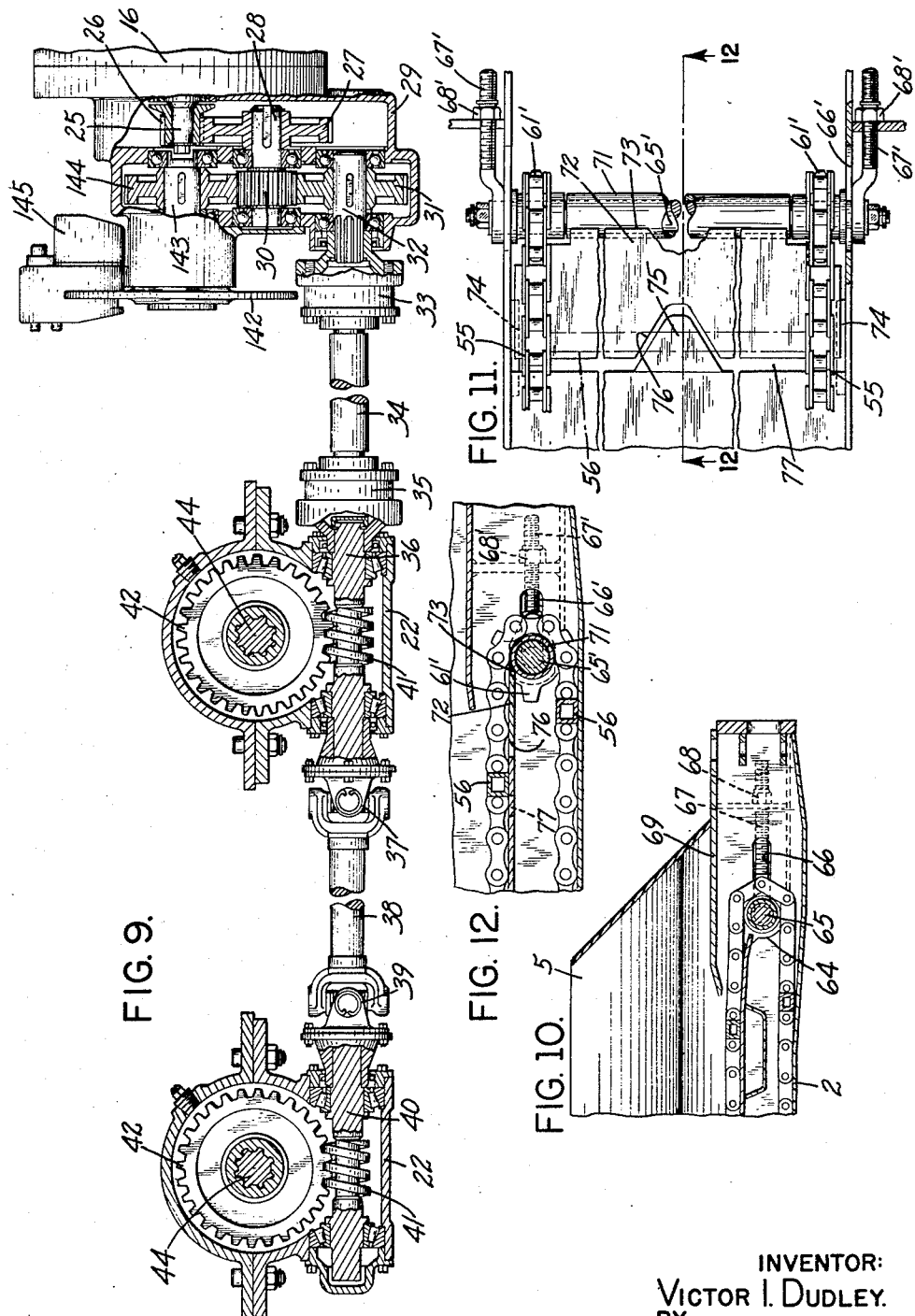
INVENTOR:
VICTOR I. DUDLEY.
BY Charles F. Osgood,
ATTORNEY.

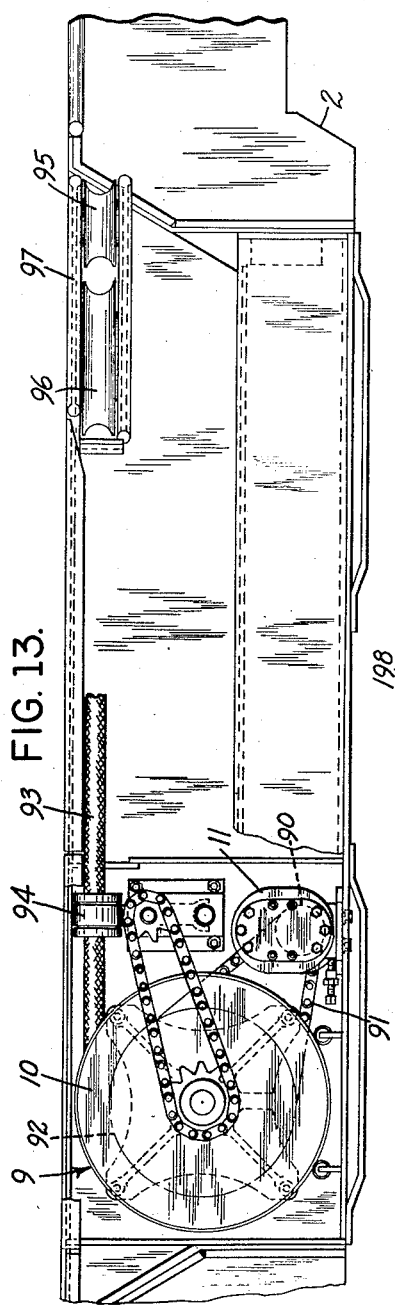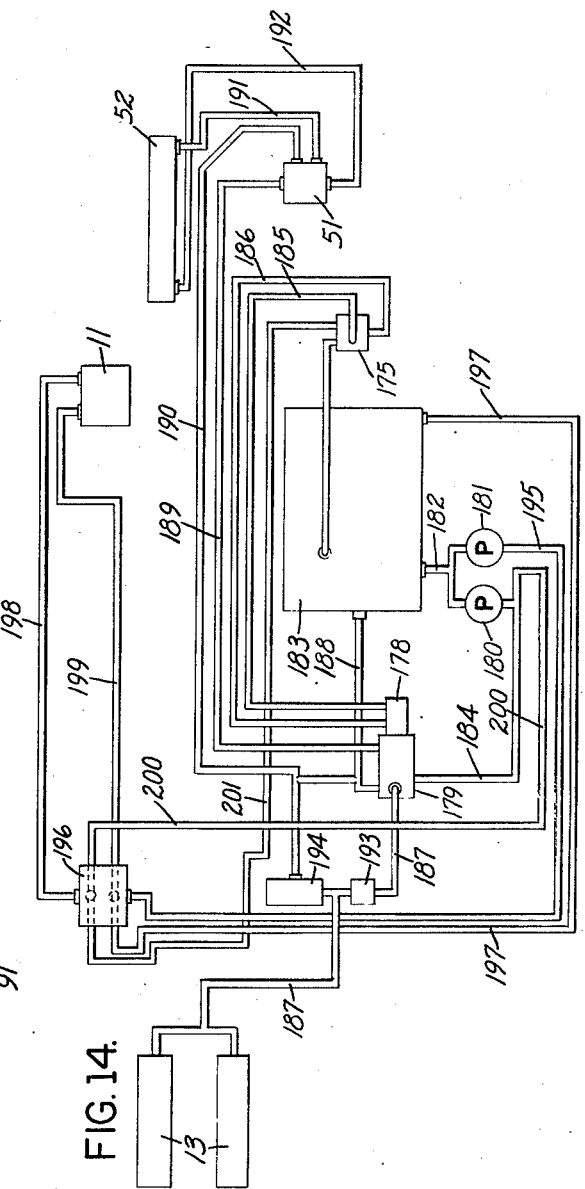

United States Patent Office 2,698,104
Patented Dec. 28, 1954

2,698,104

MINE HAULAGE VEHICLE

Victor I. Dudley, Franklin, Pa., assignor to Joy Manufacturing Company, Pittsburgh, Pa., a corporation of Pennsylvania Application October 27, 1950, Serial No. 192,571

23 Claims. (Cl. 214—83.1)

This invention relates to mine haulage vehicles and particularly to a haulage vehicle of the type known as a shuttle-car for conveying loose material such as coal in underground mines wherein the headroom is extremely low.

Heretofore, shuttle cars were not adapted for use in mines having extremely low headroom due to their height and, moreover, due to their relatively short wheel bases with the ends of the cars overhanging the wheels substantial distances, the cars tended to rock endwise as they traveled over uneven floor surfaces frequently causing the ends of the car to bump the roof in an undesirable manner. Due to the conventional arrangement of the operator's station, the cable reeling mechanism and the driving motors at the ends of the car beyond the sides of the material receiving compartment, it was heretofore necessary to keep the wheel base relatively short and the ends of the car were necessarily wide. The present invention contemplates improvements over known types of shuttle cars in that a car is provided which is extremely low in height especially designed for use in mines having low headroom, and due to the novel arrangement of parts, the wheel base is made relatively long, reducing the overhang and without increasing the overall length of the car, thereby substantially reducing the undesirable rocking action and the resultant bumping of the roof which otherwise might occur frequently in mines having very low headroom. Due to the novel design, the operator's station and the cable reel mechanism are arranged amidships between the wheel axes at the opposite sides of the car body so that it is made possible to reduce the width of the end portions of the car thereby to facilitate maneuvering of the car through the relatively restricted spaces and sharply curved passageways encountered in underground mines. By increasing the wheel base a longer space may be provided for the operator's station without increasing the overall length of the car and this is desirable since the operator must assume a reclined position due to the low height of the car and the mine headroom, and novel adjustable supports are provided for the head and back of the operator so that he may readily control and observe the movements of the car while assuming a reclined position within his station on the car. A novel arrangement of controls is also provided whereby the car may be readily controlled during its operation, and also provision is made in an improved manner for reducing the possibility of spillage of material as the car is being loaded and unloaded. The cable reeling mechanism for the power conductor cable for the several electric motors is arranged in a novel manner on the car body and is provided with improved guiding means whereby the cable is adequately guided during either direction of movement of the shuttle car. The improved shuttle car is not only low in height and relatively compact but is also rugged in construction, well adapted for its intended purpose.

An object of the present invention is to provide an improved mine haulage vehicle which, due to its novel design, is especially adapted for use in mines having low headroom. Another object is to provide an improved mine haulage vehicle of the type known as a shuttle car which due to its novel construction may readily negotiate the relatively restricted and sharply curved passageways of an underground mine. Yet another object is to provide an improved shuttle car having a novel arrangement of the operator's station and the cable reeling mechanism amidships of the car between the wheel axes whereby relatively narrow end portions for the car are made possible. A further object is to provide an improved shuttle car having a novel arrangement of the operator's station and improved adjustable supports for the operator whereby the operator may assume a reclined position in a relatively comfortable manner and may readily control and observe the car movements while assuming such reclined position in his station. A still further object is to provide a novel arrangement of controls whereby control of the car from the operator's station is facilitated. Another object is to provide an improved cable reeling mechanism for a shuttle car. Still another object is to provide improved propelling mechanism for a shuttle car of low height. Yet another object is to provide an improved shuttle car having novel features of construction and arrangements of parts. These and other objects and advantages of the invention will, however, hereinafter more fully appear.

In the accompanying drawings there are shown for purposes of illustration one form and a modification which the invention may assume in practice.

In these drawings:

Fig. 1 is a plan view of a shuttle car constructed in accordance with a preferred illustrative embodiment of the invention.

Fig. 2 is an end elevational view of the shuttle car shown in Fig. 1.

Fig. 5 is an enlarged cross section taken substantially on line 5—5 of Fig. 1.

Fig. 6 is an enlarged horizontal section taken on line 6—6 of Fig. 3.

Fig. 9 is a longitudinal vertical section showing details of the wheel drive.

Fig. 10 is an enlarged longitudinal vertical section taken on line 10—10 of Fig. 1, showing details of the take-up mechanism for the conveyor chain.

Fig. 11 is a fragmentary plan view, with parts in horizontal section, illustrating a modified form of take-up for the conveyor chain.

Fig. 12 is a detail vertical section taken on line 12—12 of Fig. 11.

Fig. 13 is an enlarged fragmentary side view looking toward the opposite side of the car and illustrating details of the cable reel mechanism.

Fig. 14 is a diagrammatic view illustrating the hydraulic system.

Figure 3:
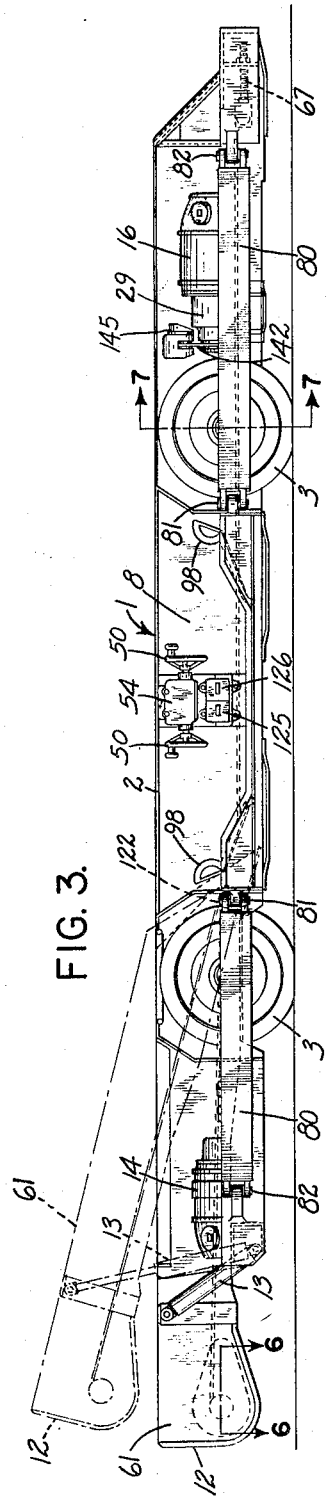
Fig. 3 is a side elevational view of the improved shuttle car, with the elevated position of the discharge end of the conveyor indicated in dotted lines.

In this illustrative construction, as shown in the drawings, the improved mine haulage vehicle or so-called shuttle car is generally designated 1 and generally comprises a body 2 supported by swivelly mounted propelling and steering wheels 3 and having a material receiving compartment 4 provided with a hopperlike portion 5 at one end of the car. Extending longitudinally along the bottom of the compartment 4 is a conventional endless flight conveyor 6 driven by a motor 7. Arranged amidships of the car body at one side thereof between the wheels are spaces one providing an operator's station 8, and electrical equipment such as a cable reel mechanism 9 is suitably arranged in the other space at the opposite side of the body and includes a cable reel 10 driven by a conventional hydraulic motor 11. The conveyor 6 has an adjustable discharge end 12 which may be adjusted by hydraulic jacks 13. A motor 14 drives liquid pumping means 15, and motors 16, 16 located at opposite sides of the car body beneath the sides of the hopperlike portion 5 drive the propelling and steering wheels 3.

Figure 7:
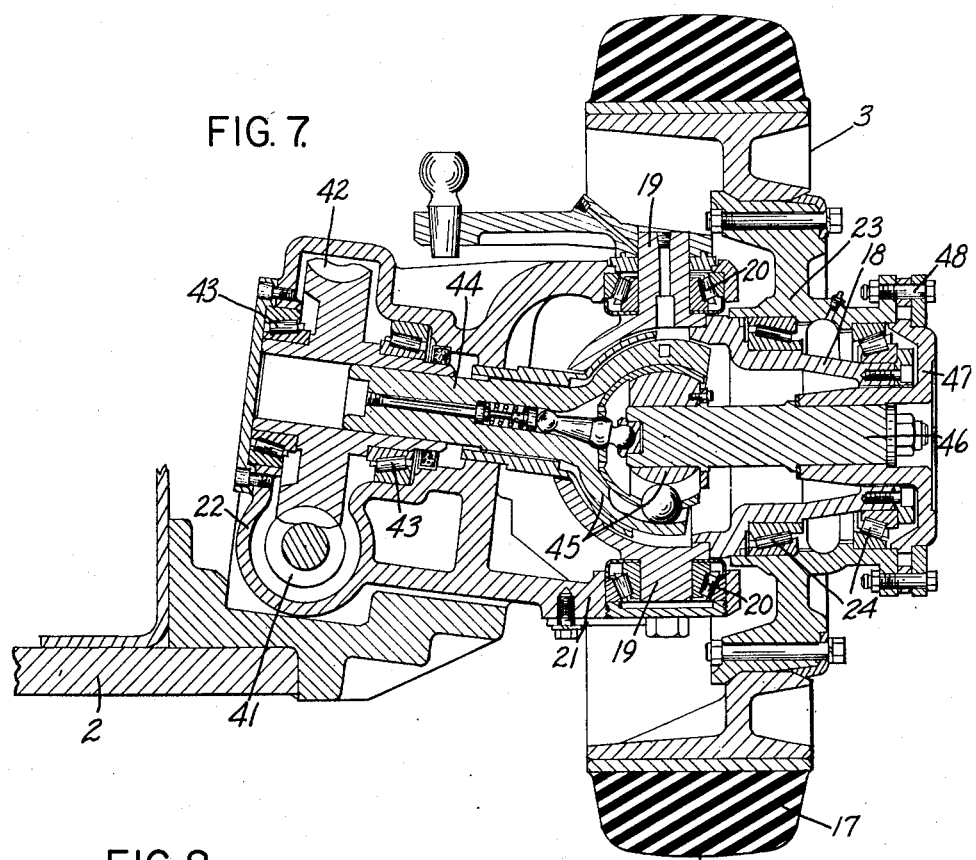
Fig. 7 is an enlarged detail vertical section taken on line 7—7 of Fig. 3, illustrating details of the wheel drive.

The propelling and steering wheels are of a much smaller diameter than those of conventional comparatively high type shuttle cars and are provided with small hard rubber tires 17 and each wheel axle 18, is disposed in a relatively low position on the car body and, as shown in Fig. 7, has aligned upper and lower vertical trunnions 19 journaled within bearings 20 supported by brackets 21 formed integral with gear housings 22 which are suitably rigidly mounted at the sides of the car body. The wheel hubs 23 are journaled on bearings 24 supported by the axles 18. Thus, each wheel axle may swing horizontally relative to the car body, and the latter is provided with suitable spaces whereby the wheels may turn with adequate clearance. The two wheels at each side of the car body have their independent driving motor 16, herein desirably a reversible electric motor, and the power shaft 25 of each motor, as shown in Fig. 9, has fixed thereto a pinion 26 meshing with a spur gear 27 supported by a longitudinal shaft 28 suitably journaled in bearings supported within a gear housing 29 suitably secured to the adjacent side of the car body. Fixed to the shaft 28 is a spur gear 30 meshing with and driving a spur gear 31 keyed to a parallel shaft 32 likewise suitably journaled within the gear housing 29. The shaft 32 is connected by a universal joint 33 to one end of a shaft 34 which extends longitudinally along one side of the car body and the other end of this shaft is connected by a universal joint 35 to a horizontally longitudinally extending worm shaft 36 suitably journaled within a gear housing 22. The shaft 36 is connected by a universal joint 37 to one end of a longitudinal shaft 38 and the opposite end of this shaft is connected by a universal joint 39 to a worm shaft 40 axially aligned with the shaft 36 and likewise journaled in gear housing 22. The shafts 36 and 40 have fixed thereto worms 41 which mesh with worm wheels 42 (see also Fig. 7). It will be noted that the shafting 38 extends longitudinally inwardly of the spaces providing the operator's station and receiving the electric equipment, as shown in Fig. 5. In order that the wheel axes of the small-diameter wheels may be maintained in a relatively low position without greatly lowering the shafting 34, 38 and 40, the axes of the worm wheels are inclined outwardly and downwardly at an oblique angle with respect to the horizontal, as shown in Fig. 7, and the worm wheels are journaled in bearings 43 supported within the gear housings 22 and have their hubs secured to coaxial inclined shafts 44. The shafts 44 are connected by universal couplings 45 to horizontal shafts 46 arranged centrally within the wheel axes 18. Connecting members 47, secured at 48 to the wheel hubs 23, are fixed to the shafts 46. Thus, the worm wheels may drive the steering and propelling wheels irrespective of the horizontally swiveled positions of the latter, and the four wheels of the car, as the motors 16 are operated in unison, may be driven to propel the car and may be concurrently operated to effect steering of the car. Evidently, in lieu of the hard rubber tires shown, the propelling and steering wheel 3 may be equipped with conventional pneumatic tires.

The steering mechanism for the shuttle car may be similar to that disclosed in my copending application, Serial No. 58,713, filed November 6, 1948, now matured into Patent No. 2,590,300, granted March 25, 1952, and in order that steering of the car may be easily effected by the operator in either of his reclined positions in his station during opposite directions of travel of the car, a pair of oppositely disposed coaxial hand wheels 50 is provided which serve to operate a valve 51 located at the operator's station for controlling flow of liquid under pressure to a steering cylinder 52 which is operatively connected through linkage, as described in the copending application referred to, to the pivoted axles 18 of the propelling and steering wheels. These hand wheels, which are in effect steering wheels, are secured to a horizontal longitudinally extending shaft 53 suitably journaled within a casing 54 secured to the adjacent side of the car body within the operator's station. This casing is located midway between the ends of the car body, centrally of the operator's station as shown, so that the handwheels are within convenient reach of the operator. The hydraulic system which embodies the valve 51 and the steering cylinder 52 will be later referred to.

The endless bottom conveyor 6 is of a conventional design and comprises side drive chains 55 suitably guided within the bottom of the car body and which pass around sprockets arranged at the opposite ends of the body in a manner to be later explained. Secured to these side chains are transverse flights of scraper bars 56 which travel along a horizontal plate 57 which provides the bottom of the compartment 4. The motor 7, as shown in Fig. 1, is mounted on the tiltable discharge end of the conveyor and is desirably arranged with its axis of rotation oblique to the longitudinal median line of the conveyor, and has its power shaft connected through a conventional speed reducer 58 to a universal drive shaft 59. This shaft is connected through beveled gearing contained within a casing 60 secured to the adjacent side of the pivoted frame 61 of the adjustable discharge end 12 of the conveyor. The casing of the motor 7 is secured directly to one of the side plates of the tiltable conveyor frame 61. The gearing contained in the casing 60 drives a transverse shaft 62 (Fig. 6) journaled within the sides of the conveyor frame 61 and which carries sprockets 63 engaging and driving the conveyor side chains 55 at the discharge end of the car body. The side chains also pass around idler sprockets 64 mounted on a cross shaft 65 (see also Fig. 10) arranged at the opposite receiving-end of the car body and this shaft is adjustable longitudinally in slots 66 formed in the sides of the body. Engaging the ends of this shaft are take-up screws 67 engaged by adjusting nuts 68 for adjusting the shaft together with the idler sprockets longitudinally of the car body to vary the tension of the conveyor side chains 55. The car body is provided with a horizontal top plate 69 which overlies the receiving-end of the conveyor, in the manner shown in Fig. 10, to prevent access of dirt to the guide sprockets.

In Figs. 11 and 12 a modified form of take-up mechanism for the conveyor side chains is disclosed. In this modified construction the idler sprockets 61' are rotatably mounted on a transverse shaft 65' which is suitably guided in longitudinal slots 66' formed in the sides of the car body. As in the embodiment above described, take-up screws 67' are connected to the opposite ends of the shaft 65' and are engaged by adjusting nuts 68' whereby the shaft may be adjusted longitudinally of the car body to vary the tension of the conveyor side chains 55. Surrounding the shaft 65' is a tubular member 71 to which a horizontal plate 72 is secured at 73 as by welding and the inner portion of this plate is slidably supported by longitudinal guides 74 secured to the opposite sides of the car body. Formed integral with the car body is a V-shaped guide projection 75 which is adapted to extend into a V-shaped notch 76 formed on the plate 72. Thus, when the shaft and idler sprockets are adjusted longitudinally relative to the car body to take up the slack in the conveyor side chains there would be present, if the projections 75 were not provided as later explained, a substantial space or gap 77 between the plate 72 and the car body into which gap the conveyor cross flights 56 would drop as the conveyor circulates within its guideways. Such dropping of the flights into the gap would cause uneven running of the chain and at times might cause jamming of the chain and to avoid this the projection 75 extending into the V-shaped notch 76 provides a support for the flights as they pass over the gap thereby to prevent uneven running and possibly jamming of the chain.

The narrowed end portions of the car body are rigidly braced by inclined bracing bars or struts 80 (see Figs. 1 and 2) which are detachably connected at 81 to the wide central portion of the car body, and these bracing bars slant inwardly and longitudinally as shown in Fig. 1 with their outer ends detachably connected at 82 near the outer ends of the narrow body portions. With the arrangement shown, the car body is not only rigidly braced, but also is formed with tapering ends which facilitate movement of the car through the restricted and sharply curved passageways of the mine. The detachable connections 81 and 82 include removal pins which may be detached to permit lateral removal of the bracing bars 80 thereby to facilitate access to the sides of the body to permit repair and adjustment of the steering and propelling wheels, the wheel driving motors and the associated parts.

In this improved construction, arranged across the top of the compartment 4 of the car are oppositely extending baffle or restrictor plates 84 bent to proper shape and secured, as by bolts, to the inner sides of the compartment walls 85. These baffle plates are disposed just beyond the juncture of the hopperlike portion 5 of the body with the vertical sides 85 of the compartment and are inclined in the direction of material-flow in the compartment and inwardly at 86 so that when the conveyor is operated during loading and unloading of the car, material is properly distributed to prevent substantial spillage laterally from the sides of the compartment. The provision of restrictors at this point is also highly important since without them the material would tend to spill over the sides and would fall into the space occupied by the operator. Another pair of similar baffle or restrictor plates 87 is arranged at points spaced longitudinally from the plates 84 toward the discharge end of the car and these additional baffle plates further tend to reduce piling up and lateral spillage of the material such as loose coal. The vertical location of these baffle plates with respect to the compartment 4 is clearly shown in Fig. 2. Thus, as the material is moved longitudinally of the compartment by the conveyor, the baffle plates taper or crown the top of the pile of material passing between them and serve to limit the height and thickness of the pile. Any material which tends to pile up after it passes the plates 84 is leveled off by the second pair of cooperating baffle plates 87, as the material is moved longitudinally toward the discharge end of the compartment. By the provision of these two pairs of baffle plates a greater volume of material may be handled for a given height of the compartment sidewalls. The pairs of baffle plates are so shaped and spaced apart that large lumps of material or coal that strike the plates will be deflected inwardly by the inclined portions of the plates until they pass between the plates and are carried away at the top of the moving pile.

Now referring to the cable reeling mechanism 9, as shown in Figs. 1 and 13, the cable reel 10 is arranged between the wheels on a horizontal transverse axis within a suitable space formed within the adjacent side of the shuttle car. The hydraulic motor 11 has fixed to its power shaft a chain sprocket 90 connected by an endless drive chain 91 to a sprocket 92 fixed to the reel shaft. A power conductor cable 93 which conducts electrical energy to the several electric motors, is wound on the reel and this cable extends longitudinally through a conventional automatic cable layer 94 (driven through a chain and sprocket connection by the reel) and between a pair of horizontal pulleys 95 and 96 suitably journaled on upright axes within a horizontal frame portion 97 integral with the car body. The pulley 95 is relatively small in diameter and the cable extends longitudinally along one side of this pulley and beyond the discharge end of the car to a suitable point of connection with a main power conductor in a well-known manner. The other larger pulley 96 is arranged in the same horizontal plane as the pulley 95 and as the car turns or moves in the opposite direction, the cable is guided by this larger pulley. The conductor cable when it is extended in the opposite direction beyond the receiving end of the car is indicated in dotted lines in Fig. 1. The pulleys 95 and 96 are located at the central wide portion of the car body, nearer a point midway between the ends of the car than to the car-ends in such manner as to adequately guide the conductor cable during either direction of movement of the car. The tapering sides of the reduced end portions of the car body tend to reduce the scraping of the cable against the adjacent side of the car body as the car travels about the mine in either direction, thereby greatly reducing cable wear. Evidently, the space which receives the cable reeling mechanism may receive other electrical equipment such as a battery, instead of the cable reeling mechanism, in a battery type car.

Figure 8:
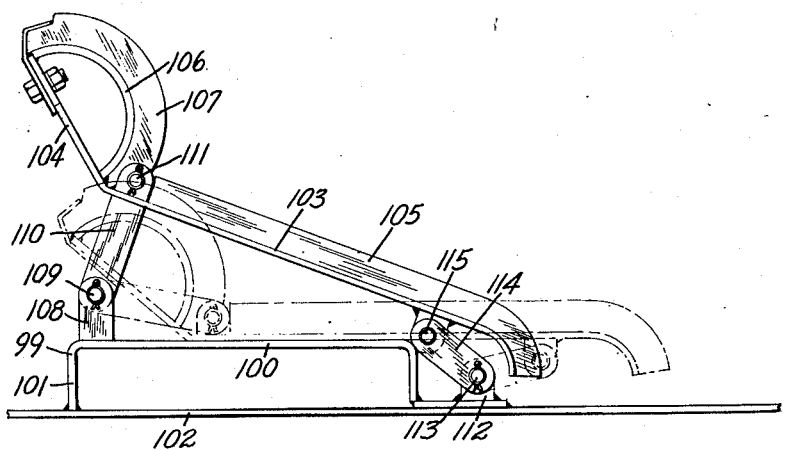
Fig. 8 is a detail view illustrating an adjustable support for the operator as he assumes a reclined position in his station on the car, the lowered position of the support being indicated in dotted lines.

Arranged in the space provided by the operator's station 8 are adjustable supports 98, 98 and these supports are located near the opposite ends of the operator's station and are oppositely disposed, as shown in Fig. 3, so that one or the other may be effective to support the shoulders and head of the operator in either reclined position assumed by the operator in his station. Each adjustable support comprises, as shown in Fig. 8, a bottom frame 99 having a horizontal upper portion 100 and bent vertical ends 101 which are secured as by welding to a horizontal platform 102 providing the bottom of the operator's station. A plate 103 has an angularly disposed upper portion 104 and the lower portion of this plate receives a cushion 105 desirably of sponge rubber. The inclined upper portion of the plate has a transverse curved member 106 secured thereto as by welding and this curved member is likewise covered with a cushion 107 of sponge rubber. Vertical lugs 108 secured to the horizontal portion 100 of the frame are pivotally connected at 109 to links 110 which are in turn pivotally connected at their upper ends at 111 to one end of the frame 103. Short lugs 112 secured to the platform 102 are pivotally connected at 113 to relatively short links 114, the latter in turn pivotally connected at 115 to the other end of the frame 103. Thus, the pairs of links 110 and 114 provide a swinging support for the frame 103, and when the links 114 assume their position against the frame 99, as shown in Fig. 8, the support is maintained in its elevated supporting position. When the links 110 and 114 are swung about their pivots into the dotted line position shown in Fig. 8, the frame 103 is lowered down flat against the horizontal portion 100 of the frame 99. When the support is elevated the shoulders of the operator may rest against the inclined cushion 105 with the back of his head resting against the upper cushion 107 thereby enabling the operator to assume a relatively comfortable reclined position within his station on the car. When one support is raised the other then unused support is lowered into a position wherein it leaves the forward view of the operator relatively unobstructed.

The pivoted frame 61 of the adjustable discharge end 12 of the conveyor has vertical side plates 120 which provide continuations of the compartment sidewalls 85, and secured to these side plates is a bottom plate 121 providing a continuation of the compartment bottom, and along which the top run of the conveyor is adapted to travel. The frame 61 is pivoted at 122 on the car body to swing in a vertical plane, and the hydraulic jacks 13 are pivotally connected between the car body and the tiltable frame to effect tilting of the latter upwardly about its pivot thus, to raise the discharge height of the discharge end of the conveyor. The means for supplying liquid under pressure to these elevating jacks will later be described.

Figure 4:
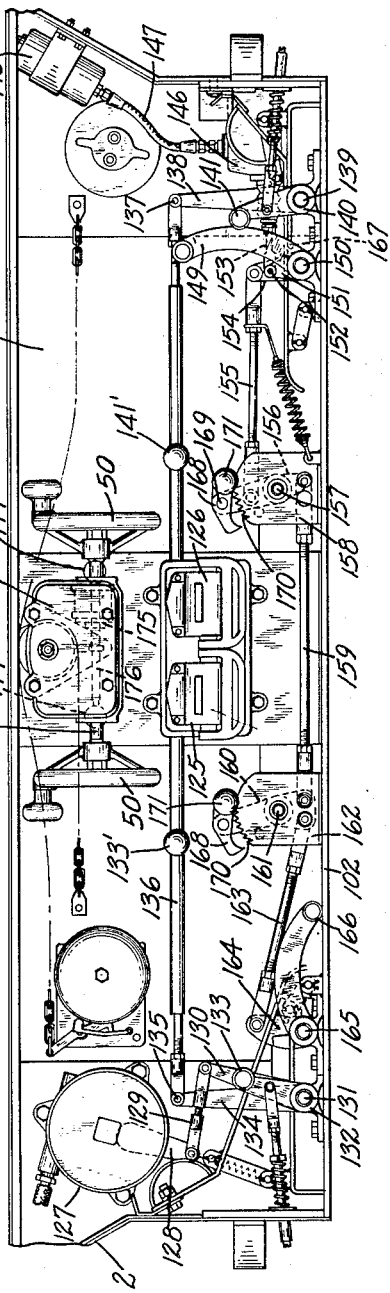
Fig. 4 is a fragmentary enlarged side view of the shuttle car showing the operator's station and the novel grouping of the various controls.

Again referring to the controls located at the operator's station, it will be noted that arranged just below the gear casing 54 of the steering means, as shown in Fig. 4, is a conventional hand switch 125 for controlling the conveyor driving motor 7 and a conventional safety switch 126 for controlling the circuit to the wheel driving motors 16, in conjunction with a switch 127, for starting, stopping and reversing the traction motors. The switch 127 is provided with dual foot and hand controls comprising a switch actuating lever 128 pivotally connected by an adjustable link 129 to a lever 130 secured to a transverse shaft 131 mounted to turn in bearing brackets 132 secured to the bottom plate or platform 102 of the operator's station. Also secured to the shaft 131 at its outer end is a foot pedal 133. A lever 134 secured to the inner end of the shaft 131 is pivotally connected at 135 to one end of a longitudinally extending operating rod 136 disposed near the inner wall of the operator's station. The opposite end of this rod is pivotally connected at 137 to a lever 138 secured to the inner end of a transverse shaft 139 journaled in bearing brackets 140 secured to the platform 102 near the end of the operator's station opposite from the end at which the shaft and brackets 131 and 132 are located. Secured to the outer end of the shaft 139 is a foot pedal 141. The foot pedals 133 and 141 are conveniently arranged in the operator's station so that they may be operated in either of the opposite positions assumed by the operator in his station. Auxiliary dual hand controls 133' and 141' are secured to the rod 136 (Fig. 4) at opposite sides of the middle portion of the operator's station. Thus, the switch 127 may be readily operated to control operation of the wheel driving motors 16 whenever the safety switch 126 is closed.

The supporting and propelling wheels are provided with conventional hydraulic disc type brakes likewise controlled from the operator's station. These brakes comprise brake discs 142 (see Fig. 9) secured to longitudinal shafts 143 suitably journaled within the gear casings 29 at the opposite sides of the car body. Keyed to these shafts are spur gears 144 meshing with and driven by the spur gears 30 of the wheel drive gearings. Thus, whenever the wheels are driven the brake discs are rotated at a relatively high speed. Cooperating with each disc is a hydraulic cylinder 145 which contains a piston for operating a "spot" brake element, in a well-known manner. Liquid under pressure may be supplied to the brake operating cylinders by a conventional master cylinder 146, and connected to this master cylinder through a conduit 147 is an auxiliary liquid reservoir 148 located in a relatively high position above the master cylinder (see also Fig. 4) for maintaining the desired headpressure in the brake fluid system. Again referring to Fig. 4, it will be observed that a foot pedal 149 is secured to a transverse shaft 150 journaled in bearing brackets secured to the platform 102 and a lever 151 journaled on this shaft is pivotally connected at 152 to an operating rod 153 for the master cylinder 146. The pedal 149 may swing freely downwardly relative to the lever 151 into its inoperative position against the platform 102, and when the pedal is swung upwardly into its operative position an abutment on the shaft 150 may engage an abutment on the lever 151, so that the pedal may swing the lever, to actuate the rod 153. To provide a dual control for the brakes within the operator's station, the lever 151 has a lever 154 connected thereto which is in turn connected by a rod 155 to a lever 156 pivoted at 157 on a bracket 158 mounted on the platform 102. The lever 156 is pivotally connected to a rod 159 extending along the inner side of the operator's station to a lever 160 pivotally mounted at 161 on a similar bracket 162, and this lever is connected by a rod 163 to a lever 164 journaled on a transverse shaft 165 rotatably mounted at the opposite end of the operator's station from the end in which the shaft 150 is located. Secured to the shaft 165 is a foot pedal 166, and this pedal, like the pedal 149, when in raised operative position has an abutment engageable with an abutment on the lever 164. Thus the pedal 164 may be freely swung down against the platform when not in use. Thus either pedal may be used to operate the master cylinder 146, and either may be swung into an inoperative position down against the platform. The pedal 166 is shown in Fig. 4 in its lowered inoperative position down against the platform 102, while the other pedal at the opposite end of the operator's station is held up in its operating position by a pin 167 on the lever engaged by the overlying plate 103 of the adjacent lowered adjustable support 98, in the manner shown. Thus, when the operator's support is lowered the foot pedal 149 is maintained in the elevated position shown so that it may be conveniently operated by the operator. Counter-weighted dogs 168 pivoted at 169 at the upper ends of the levers 156 and 160 respectively, are engageable with ratchet teeth 170 on the upper portions of the brackets 158 and 162, for positively holding the brakes in applied position. The counter-weights 171 of these dogs normally maintain the latter in released position out of engagement with the ratchet teeth, and the dogs must be manually swung by the operator into positions to engage the teeth. Thus, the hydraulic brakes may be readily controlled by the operator in either of his positions in his station. It will be noted that the various levers and operating rods are provided with usual coil retracting springs for returning the controls to their inoperative positions when released by the operator and since such springs are conventional, detail description thereof is not given.

Also arranged in the operator's station is a conventional remote control valve 175 having an operating rod 176 provided with operating handles 177. This remote control valve controls flow of liquid under pressure to a servomotor 178 for actuating a conventional elevating valve device 179 which in turn controls the flow of liquid under pressure to the elevating jacks 13 for the tiltable discharge end 12 of the conveyor. By the provision of the remote control valve 175 located at the operator's station and the servomotor actuated valve device 179 for the elevating jacks, it is possible to locate a relatively small, compact valve at the operator's station with small control conduits leading from the operator's station and extending along one side of the vehicle body to the servomotor, and also to locate the large elevating valve device 179 at any desired position on the car body outside of the operator's station.

The hydraulic system is shown diagrammatically in Fig. 14, and the pumping means 15 comprises separate pumps 180 and 181 driven in unison by the motor 14 and having their suction sides connected by a conduit 182 to a liquid tank 183. The discharge of the pump 180 is connected by a conduit 184 to the elevating valve device 179. The remote control valve 175 is connected by conduits 185 and 186 to the servomotor 178 whereby liquid may be conducted thereto and discharged therefrom to effect location of the valve element of the valve device 179 in the desired position. Leading from the elevating valve device 179 is a conduit 187 connected to the elevating jacks 13, and a return conduit 188 connects the elevating valve device back to the tank 183. Also leading from the valve device 179 is a supply conduit 189 connected to the steering valve 51, and a discharge conduit 190 leads from the steering valve to the return conduit 188 connected to the tank. The steering valve 51 is connected by conduits 191 and 192 to the opposite ends of the steering cylinder 52 of the steering gear. A conventional check valve device 193 in the conduit 187 leading to the elevating jacks permits flow of liquid under pressure to the elevating jacks and provides restricted discharge of liquid from the jacks when the valve element of the valve device 179 is positioned to connect the conduit 187 to the return conduit 188. A conventional safety valve 194 connected to the conduit 187 is set to open at a predetermined pressure thereby to prevent excessive pressure in the jack supply line. The discharge side of the pump 181 is connected by a conduit 195 to a valve device 196 of a type well known to those skilled in the art, for controlling the motor 11 of the cable reel 10 whereby the reel may be driven in winding direction and may rotate in unwinding direction, either with or without predetermined resistance, and a return conduit 197 leads from the valve device 196 back to the tank 183. Conduits 198 and 199 connect the valve device 196 to the opposite sides of the reversible reel motor 11. The discharge side of the pump 180 is also connected by a conduit 200 to the reel control valve 196. Liquid under pressure may be supplied from the reel control valve to the remote control valve 175 through a conduit 201. The reel control valve does not per se enter into the present invention and needs no further detailed discussion other than to state the liquid for operating the servomotor 178 is taken from the reel motor control. Since the general mode of operation of a shuttle car of the type disclosed is well known to those skilled in the art, a description of the mode of operation thereof appears unnecessary to the proper understanding of the invention.

As a result of this invention, an improved material haulage vehicle is provided which is extremely low in height especially designed for use in underground mines having relatively low headroom and the vehicle, due to its novel design, substantially eliminates the usual endwise bouncing or rocking tendency such as is encountered in conventional shuttle cars, as it travels over an uneven floor surface, thereby avoiding frequent bumping of the mine roof so that the car may be efficiently operated under low headroom. The shuttle car is not only low and compact but due to its novel shape, with relatively narrow tapering ends, it is possible readily to negotiate sharply curved and restricted passageways such as are encountered in an underground mine. By the provision of a car having a relatively long wheel base, much longer than that of a conventional shuttle car, it is possible to locate the spaces for the electrical equipment and the operator's station amidships of the car and intermediate the front and rear wheels, and to substantially reduce overhang of the ends of the car beyond the wheels without decreasing the overall length of the car. The novel cable reeling mechanism with its novel location of the guide sheaves enables, the power conductor cable to be properly guided in directions longitudinally of the car during either direction of travel of the car, and the novel shape of the car body, with its tapering ends, eliminates excessive scraping or dragging of the conductor cable on the sides of the car, resulting in decreased wear of the cable. The novel dual control arrangement and its novel location within the operator's station provides convenience in control and the improved adjustable supports for the operator enables him to assume a relatively comfortable reclined position in his station during either direction of travel of the car. These and other advantages of the invention will be clearly apparent to those skilled in the art.

While there are in this application specifically described one form and a modification which the invention may assume in practice, it will be understood that this form and modification thereof are shown for purposes of illustration and that the invention may be further modified and embodied in various other forms without departing from its spirit or the scope of the appended claims.

What I claim as new and desire to secure by Letters Patent is:

1. A material haulage vehicle for use in underground mines having low headroom comprising a vehicle body having supporting and propelling wheels, said body having a material receiving compartment extending lengthwise thereof and including a hopperlike compartment portion near the receiving end of the vehicle and a relatively narrow longitudinal compartment portion communicating with said hopper portion and extending with parallel sides to the discharge end of the vehicle, an endless conveyor extending along the bottom of said compartment for loading material in the compartment and for discharging material from the compartment, a pair of oppositely extending, spaced restrictor plates secured to said parallel sides of said narrow compartment portion at the top portion of said compartment near the point where said hopperlike portion communicates with said narrow portion, and a cooperating pair of oppositely extending, spaced restrictor plates secured to the top portions of said parallel sides of said narrow compartment portion within the latter and spaced longitudinally toward the discharge end of the vehicle from said first mentioned pair of restrictor plates, said pairs of restrictor plates disposed outside of said hopper portion as aforesaid and cooperating to act on the top portion of the material in the compartment as the material is moved longitudinally in said narrow compartment portion by said conveyor and one supplementing the action of the other to level off and direct the material thereby to reduce spillage of material laterally over the sides of the car body and to maintain lower height of the material along the sides of the length of said relatively narrow portion of said compartment.

2. A material haulage vehicle for use in underground mines having low headroom comprising a vehicle body having front and rear supporting and propelling wheels, said body having a material receiving compartment extending lengthwise thereof and including a hopperlike compartment portion near the receiving end of the vehicle and a relatively narrow longitudinal compartment portion communicating with said hopper portion and extending with parallel sides throughout a major portion of the length of said body to the discharge end of the vehicle, an endless conveyor extending along the bottom of said compartment for moving material longitudinally therein during loading and unloading of the vehicle, means providing an operator's station at one side of the body beyond the adjacent outer side of said narrow compartment portion intermediate the front and rear wheels, and a pair of oppositely extending, spaced restrictor plates secured to the upper portions of said parallel sides of said narrow portion of said compartment within said narrow portion near the point where said hopperlike portion communicates with said narrow compartment portion and near the adjacent end of said station providing means for directing the top portion of the material as it is moved longitudinally in said compartment from said hopperlike portion to said narrow portion to maintain low height of the material along the sides of the length of the compartment and to prevent substantial spillage of material laterally over the sides of the body into said operator's station.

3. A material haulage vehicle for use in underground mines having low headroom comprising a vehicle body having front and rear supporting and propelling wheels, said body having a material receiving compartment extending lengthwise thereof and including a hopperlike compartment portion near the receiving end of the vehicle and a relatively narrow longitudinal compartment portion communicating with said hopperlike portion and extending with parallel sides to the discharge end of the vehicle, an endless conveyor extending along the bottom of said compartment for moving material longitudinally therein during loading and unloading of the vehicle, means providing an operator's station at one side of the body beyond the adjacent outer side of said narrow portion of said compartment and intermediate the front and rear wheels, a pair of oppositely extending, spaced restrictor plates secured to said parallel sides of said compartment near the point where said hopperlike portion communicates with said narrow compartment portion for directing the top portion of the material as it is moved longitudinally in said compartment from said hopperlike portion to said narrow portion to prevent substantial spillage of material over the sides of the body whereby falling of material into said operator's station is substantially prevented, and a cooperating pair of oppositely extending, spaced restrictor plates secured to said parallel sides of said compartment portion and spaced longitudinally toward the discharge end of the vehicle from said first mentioned pair of restrictor plates, said last mentioned restrictor plates cooperating with said first-mentioned restrictor plates and supplementing the action of the latter and acting to direct and level off the top portion of the material as it passes through said narrow compartment portion further to reduce spillage of material over the sides of the body and cooperating with said first-mentioned restrictor plates to maintain spillage of the material flowing through said compartment at a minimum along the length of the vehicle.

4. A material haulage vehicle for use in underground mines having low headroom comprising a vehicle body having pairs of front and rear supporting wheels, the vehicle having a relatively long wheel base, reducing the overhang of the ends of the body longitudinally beyond said wheels without increasing the overall length of the vehicle, said body having a material receiving compartment including a large widened hopperlike portion near the receiving end of the vehicle and a relatively narrow longitudinal portion communicating with said hopperlike portion and extending to the discharge end of the vehicle, said hopperlike portion having slanting sides providing spaces thereneath within the sides of the body, means providing spaces at the sides of the body beyond the outer sides of said narrow portion of said compartment and intermediate the front and rear wheels, one of said last-mentioned spaces receiving accessory equipment and the other space providing a station for the operator and having a platform disposed below the compartment bottom and of sufficient length to accommodate an operator in a reclined position, said latter spaces located amidships of the vehicle at the outer sides of said material receiving compartment, separate motors located in said first-mentioned spaces at the sides of the receiving end of the body beneath the slanting sides of said hopperlike portion, and driving connections between said motors respectively and the two wheels at each side of the vehicle including parallel drive shaftings extending longitudinally inwardly of said second-mentioned spaces above the level of said platform at the inner sides of said spaces and located intermediate and operatively connected to the front and rear wheels in close relation to the sides of said compartment, said parallel drive shaftings respectively operatively connected to a pair of front and rear wheels at one side of said body.

5. In a material haulage vehicle, a vehicle body having a material receiving compartment extending lengthwise thereof and an endless conveyor extending along the bottom of said compartment for moving the material longitudinally in said compartment, said conveyor having side chains and cross flights connected at spaced intervals to said side chains, driving means operatively connected to the discharge end of said conveyor for effecting circulation of said side chains relative to said body, guiding means for said conveyor including guide sprockets arranged at the receiving end of the vehicle and engaging said side chains and a transverse shaft extending between said guide sprockets, and a take-up device including adjusting devices at the sides of the body and connected to the ends of said shaft for adjusting said guide sprockets in unison longitudinally of said body for varying tension of said side chains, and said body having a top plate rigidly secured to said body and extending horizontally across the top of the receiving end of said conveyor, said top plate overlying the receiving end of said conveyor above said guide sprockets and the portion of the conveyor which passes about said guide sprockets to prevent access of material to said guide sprockets.

6. In a material haulage vehicle, a vehicle body having a material receiving compartment extending lengthwise thereof and an endless conveyor extending along the bottom of said compartment for moving the material longitudinally in said compartment, said conveyor having side chains and cross flights connected at spaced intervals to said side chains, driving means operatively connected to the discharge end of said conveyor for effecting circulation of said side chains relative to said body, guiding means for said conveyor including guide sprockets arranged at the receiving end of the vehicle and engaging said side chains and a transverse shaft extending between said guide sprockets, and a take-up device including adjusting devices at the sides of the body and connected to the ends of said shaft for adjusting said guide sprockets in unison longitudinally of said body to vary the tension of said side chains, and said body having a top plate overlying the receiving end of said conveyor above said guide sprockets to prevent access of material to said guide sprockets, said overlying plate being adjustable longitudinally of the body with said shaft, said body having a horizontal projection of V-shape in plan and the inner edge of said plate being provided with a V-shaped recess for receiving said projection, there being a transverse gap left between the body and the inner edge of said plate when said plate is moved longitudinally away from said body during adjustment of said conveyor side chains, and said projection providing a guide for said conveyor flights for preventing dropping of said flights into said gap as said conveyor is driven.

7. A reversible material haulage vehicle for use in underground mines having low headroom comprising a vehicle body having pairs of swivelled front and rear steering and propelling wheels adapted to travel over the mine floor, a material receiving compartment extending lengthwise of the body and an endless conveyor extending along the bottom of the compartment for moving material longitudinally in said compartment and having a discharge end, means providing an operator's station at one side of the body beyond the adjacent outer side of said compartment and intermediate the front and rear wheels and in which an operator may assume opposite reclined positions during the opposite directions of travel of the vehicle, said operator's station being located on said body at a point remote from said discharge end of said conveyor, steering means for the vehicle including a steering control device arranged centrally in the operator's station close to and equidistantly spaced from a point midway between the ends of said station and disposed on a longitudinal axis so that the operator may readily operate said steering control device in either of his opposite reclined positions in said station, a source of fluid under pressure, steering gear for turning the steering wheels including a double-acting hydraulic cylinder located on the body outside of the operator's station and operatively connected to said swivelled wheels and a control valve located at said operator's-station in adjacency to said steering control device and actuated by the latter for controlling fluid flow to and the exhaust of fluid from the ends of said hydraulic cylinder, said discharge end of said conveyor being tiltable in vertical planes, hydraulic jacks for tilting said discharge end to vary the discharge height of said conveyor, and an additional control valve located in said station in adjacency to said steering control device and also operable in either of the opposite reclined positions assumed by the operator in his station for controlling the fluid flow from said source to and exhaust of fluid from said hydraulic jacks.

8. A material haulage vehicle for use in underground mines having low headroom comprising a vehicle body having supporting, propelling and steering means and adapted to travel over the floor of a mine, said body having a material-receiving compartment extending lengthwise from end to end thereof including a widened hopperlike compartment portion near the receiving end of the vehicle and a relatively narrow longitudinal compartment portion extending throughout a major portion of the length of said body and communicating with said widened hopperlike portion, said narrow compartment portion having parallel vertical sides extending from said hopperlike portion to the discharge end of the vehicle, an endless conveyor extending along the bottom of said compartment throughout its length for moving material longitudinally therein during loading and unloading of the vehicle, a pair of oppositely extending horizontal restrictor plates secured to the upper portions of the parallel sides of said narrow portion of said compartment near the point where said hopperlike portion communicates with said narrow portion, and a cooperating pair of similar restrictor plates secured to the upper portions of said parallel sides of said narrow compartment portion and spaced longitudinally in said narrow portion from said first mentioned pair of restrictor plates toward the discharge end of the vehicle, the restrictor plates of each pair extending inwardly toward the longitudinal center of said compartment and spaced apart at their adjacent ends to provide relatively restricted spaces between said restrictor plates, said pairs of restrictor plates cooperating to act on the top portion of the material in said compartment as the material is moved longitudinally therein by said conveyor and one pair of restrictor plates supplementing the action of the other to level off the sides of and to direct the material thereby to reduce spillage over the sides of said narrow compartment portion and to maintain low height of the material along the sides of the length of said compartment.

9. A material haulage vehicle as set forth in claim 8 wherein said vehicle body has a longitudinal space providing an operator's station located at one side of the vehicle, said space extending longitudinally along the outer side of one vertical side of said narrow portion of said compartment and said restrictor plates being so located adjacent to said space that spillage of material over the adjacent side of said compartment into the operator's station is substantially reduced.

10. A material haulage vehicle for use in underground mines having low headroom comprising a vehicle body having supporting, and propelling means and adapted to travel over the floor of a mine, said body having a material-receiving compartment extending lengthwise from end to end thereof and including a widened hopper-like portion near the receiving end of the vehicle and a relatively narrow longitudinal compartment portion extending throughout the major portion of the length of said body between said hopperlike portion and the discharge end of the vehicle, said narrow compartment portion having parallel vertical sides, an endless conveyor extending along the bottom of said compartment for loading material into the compartment and for discharging material from the compartment, and pairs of cooperating baffle members secured to the upper portions of said vertical sides of said narrow compartment portion, the baffle members of each pair extending horizontally inwardly toward one another but spaced apart at their adjacent ends to provide a restricted space therebetween, one pair of baffle members spaced longitudinally of said narrow compartment portion from said other pair and one pair supplementing the action of the other, said baffle members cooperating to level off the sides of and to direct the material as it is moved longitudinally in said compartment by said conveyor thereby to reduce spillage of material laterally over the vertical sides of said narrow compartment portion and to maintain low height of the material along the sides of the length of the compartment.

11. A material haulage vehicle as set forth in claim 10 wherein said vehicle body has a longitudinal recess at one side thereof providing an operator's station, said recess extending longitudinally along the outer side of one vertical side of said narrow portion of said compartment and said baffle members being so located adjacent to the space at the inner side of said compartment portion that spillage of material over the adjacent side of said compartment into the operator's station is substantially reduced.

12. In a material haulage vehicle, a vehicle body having a material-receiving compartment extending lengthwise thereof, an endless conveyor extending along the bottom of said compartment for moving the material longitudinally in said compartment, said conveyor having cross flights located at spaced intervals along its length, driving means operatively connected to said conveyor for effecting circulation thereof relative to said body, guiding means for said conveyor including a rotary guide member arranged at one end of the conveyor and about which said conveyor passes, an adjustable mounting on which said member is journaled, a take-up device including adjusting devices at the sides of the body and connected to said adjustable mounting for adjusting said rotary guide member longitudinally of said body to vary the tension of said conveyor, and a top plate overlying said end of said conveyor above said rotary guide member to prevent access of material to said guide member, said overlying plate connected to said mounting for adjustment longitudinally therewith relative to said body, said body having a horizontal projection and said plate having a recess for receiving said projection, there being a transverse gap left between the body and the inner edge of said plate when said plate is moved longitudinally in one direction during adjustment of said conveyor, and said projection providing a guide for said conveyor flights for preventing dropping of said flights into said gap as said conveyor is driven.

13. A material handling apparatus comprising a material-receiving body having a relatively wide material receiving portion and a communicating relatively narrow discharge portion, means for effecting movement of material from said material-receiving portion through said discharge portion, and pairs of elevated, generally horizontal baffle means in said narrow discharge portion, said pairs of baffle means spaced apart longitudinally of said body within said narrow portion with one pair disposed in adjacency to the points of communication of said narrow portion with said relatively wide portion, said pairs of baffle means disposed in oblique relation to the sidewalls of said narrow portion for leveling off the sides of the top of the material being moved longitudinally by said material moving means toward the discharge end of the body.

14. A material handling apparatus comprising a material receiving body having a relatively wide material receiving portion at the receiving end thereof and a communicating relatively narrow discharge portion extending longitudinally from said receiving portion to the discharge end of the body, means for effecting movement of material from said receiving portion longitudinally through said narrow discharge portion, and pairs of cooperating baffle means spaced apart longitudinally in said narrow portion for restricting movement of the material longitudinally in said narrow portion toward the discharge end of said body, each pair of said baffle means having portions projecting laterally towards each other and spaced apart less than the width of said narrow discharge portion and arranged near the top only of said narrow discharge portion whereby flow of material in said narrow portion may take place beneath said baffle means, said baffle means leveling off the sides of the top of the material as it is moved longitudinally in said narrow portion by said material moving means to reduce spillage of material over the sides of said narrow portion.

15. A material handling apparatus as set forth in claim 14 wherein said narrow discharge portion has parallel vertical side walls and said projecting portions of each of said pairs of baffle means are obliquely disposed with respect to said vertical sidewalls at relatively opposite inclinations and make with the inner sides of said sidewalls angles whose sides diverge toward the discharge end of said body.

16. In a low height mine haulage vehicle, the combination comprising a vertically compact body having supporting, pairs of propelling and steering wheels swivelled to turn horizontally and adapted to travel over the floor of a mine, said body having a material-receiving compartment extending throughout its length intermediate the pairs of side wheels, a motor driven conveyor extending along the bottom of said compartment for effecting loading and unloading of said compartment, said body having elongated spaces extending longitudinally at the sides thereof intermediate the front and rear wheels, one space providing a station for the operator and the other space receiving accessory equipment, said body having narrow elongated vertical chambers extending longitudinally between the outer sides of said compartment and the inner walls of said spaces, a pair of motors, one disposed at each side of said compartment near one end of said body, said motors spaced longitudinally of said body beyond said wheels, one motor individual to the drive of each pair of front and rear side wheels, and driving connections between said motors and said pairs of front and rear side wheels including drive shaftings extending longitudinally in said narrow longitudinal chambers respectively and connections between said shaftings and said pairs of side wheels, said latter connections including drive gearings, one individual to the drive for each wheel, and spaced longitudinally of said body beyond the ends of said elongated spaces and said vertical chambers.

17. A haulage vehicle as set forth in claim 16 wherein said longitudinally extending shaftings between said drive gearings are disposed below a horizontal plane including the bottom of said compartment.

18. In a low height mine haulage vehicle, the combination comprising a vertically compact body having supporting, pairs of front and rear propelling and steering wheels swivelled to turn horizontally and adapted to travel over the floor of a mine, said body having a material-receiving compartment extending throughout its length intermediate the pairs of side wheels, a motor driven conveyor extending along the bottom of said compartment for effecting loading and unloading of said compartment, said body having elongated spaces extending longitudinally at the sides thereof intermediate the front and rear wheels, one space providing a station for the operator and the other space receiving accessory equipment, said body having narrow elongated vertical chambers extending longitudinally between the outer sidewalls of said compartment and the inner walls of said spaces, a pair of motors, one disposed at each side of said compartment near one end of said body, one motor individual to the drive of each pair of side wheels, and driving connections between said motors and said pairs of side wheels including drive shaftings extending longitudinally in said narrow longitudinal chambers respectively and connections between said shaftings and said pairs of side wheels, said last mentioned connections including drive gearings, one individual to the drive for each wheel, and connected to said shaftings at the outer sides of said compartment beyond the ends of said spaces and each gearing including an outwardly and downwardly inclined shaft lying in a vertical plane extending transversely of said body, a gear secured to said shafting and a gear meshing with said gear and connected to an inclined shaft.

19. A material haulage vehicle comprising a vehicle body having supporting and propelling wheels, said body having a material receiving compartment extending lengthwise thereof and including a hopperlike compartment portion near the receiving end of the vehicle and a relatively narrow longitudinal compartment portion communicating with said hopper portion and extending with parallel sides throughout a major portion of the length of said body to the discharge end of the vehicle, an endless conveyor extending along the bottom of said compartment for moving material longitudinally therein during loading and unloading of the vehicle, means providing an operator's station at one side of the body beyond the adjacent outer side of said narrow comparment portion, and a pair of oppositely extending, spaced restrictor plates secured to the upper portions of said parallel sides of said narrow portion of said compartment within said narrow portion near the point where said hopperlike portion communicates with said narrow compartment portion and near the adjacent end of said station providing means for directing the top portion of the material as it is moved longitudinally in said compartment from said hopperlike portion to said narrow portion to maintain low height of the sides of the material as it moves along the length of the compartment and to prevent substantial spillage of material laterally over the sides of the body into said operator's station.

20. A material haulage vehicle comprising a vehicle body having supporting and propelling wheels, said body having a material receiving compartment extending lengthwise thereof and including a hopperlike compartment portion near the receiving end of the vehicle and a relatively narrow longitudinal compartment portion communicating with said hopperlike portion and extending with parallel sides to the discharge end of the vehicle, an endless conveyor extending along the bottom of said compartment for moving material longitudinally therein during loading and unloading of the vehicle, means providing an operator's station at one side of the body beyond the adjacent outer side of said narrow portion of said compartment, a pair of oppositely extending, spaced restrictor plates secured to said parallel sides of said narrow compartment near the point where said hopperlike portion communicates with said narrow compartment portion for directing the top portion of the material as it is moved longitudinally in said compartment from said hopperlike portion to said narrow portion to prevent substantial spillage of material over the sides of the body whereby falling of material into said operator's station is substantially prevented, and a cooperating pair of oppositely extending, spaced restrictor plates secured to said parallel sides of said compartment portion and spaced longitudinally toward the discharge end of the vehicle from said first mentioned pair of restrictor plates, said last mentioned restrictor plates cooperating with said first-mentioned restrictor plates and supplementing the action of the latter and acting to direct and level off the sides of the top portion of the material as it passes through said narrow compartment portion further to reduce spillage of material over the sides of the body and cooperating with said first-mentioned restrictor plates to maintain the height of the sides of the material flowing through said compartment below the top of the latter along the length of the vehicle.

21. A material haulage vehicle comprising a vehicle body having pairs of front and rear supporting wheels, said body having a material receiving compartment including a large widened hopperlike portion near the receiving end of the vehicle and a relatively narrow longitudinal portion communicating with said hopperlike portion and extending to the discharge end of the vehicle, said hopperlike portion having slanting sides providing spaces therebeneath within the sides of the body, means providing spaces at the sides of the body beyond the outer sides of said narrow portion of said compartment, one of said last-mentioned spaces receiving accessory equipment and the other space providing a station for the operator and having a platform disposed below the compartment bottom and of sufficient length to accommodate an operator, said latter spaces located at the outer sides of said material receiving compartment, separate motors located in said first-mentioned spaces at the sides of the receiving end of the body beneath the slanting sides of said hopperlike portion, and driving connections between said motors respectively and the two wheels at each side of the vehicle including parallel drive shaftings extending longitudinally inwardly of said second-mentioned spaces above the level of said platform at the inner sides of said spaces and located intermediate and operatively connected to the front and rear wheels in close relation to the sides of said compartment, said parallel drive shaftings respectively operatively connected to a pair of front and rear wheels at one side of said body.

22. A reversible material haulage vehicle comprising a vehicle body having pairs of swivelled front and rear steering and propelling wheels adapted to travel over the mine floor, a material receiving compartment extending lengthwise of the body and an endless conveyor extending along the bottom of the compartment for moving material longitudinally in said compartment and having a discharge end, means providing an operator's station at one side of the body beyond the adjacent outer side of said compartment and in which an operator may assume opposite positions during the opposite directions of travel of the vehicle, said operator's station being located on said body at a point remote from said discharge end of said conveyor, steering means for the vehicle including a steering control device arranged centrally in the operator's station close to and with its opposed portions equidistantly spaced from a point midway between the ends of said station and disposed so that the operator may readily operate said steering control device in either of his opposite positions in said station, a source of fluid under pressure, steering gear for turning the steering wheels including a double-acting hydraulic cylinder located on the body outside of the operator's station and operatively connected to said swivelled wheels and a control valve located at said operator's station in adjacency to said steering control device and actuated by the latter for controlling fluid flow to and the exhaust of fluid from the ends of said hydraulic cylinder, said discharge end of said conveyor being tiltable in vertical planes, hydraulic jacks for tilting said discharge end to vary the discharge height of said conveyor, and an additional control valve located in said station in adjacency to said steering control device and also operable in either of the opposite positions assumed by the operator in his station for controlling the fluid from said source to and the exhaust of fluid from said hydraulic jacks.

23. A material haulage vehicle as set forth in claim 1 wherein the inner portion of said hopperlike compartment portion has its top edges inclined inwardly at a substantial angle to the parallel sides of said narrow compartment portion and portions of said first mentioned restrictor plates are disposed at substantially the same angles as said inclined top edges of said hopper portion.

References Cited in the file of this patent

UNITED STATES PATENTS

| Number | Name | Date |
|---|---|---|
| 1,241,481 | Walker | Sept. 25, 1917 |
| 1,375,562 | Cartzdafner et al. | Apr. 19, 1921 |
| 1,527,419 | Leonard | Feb. 24, 1925 |
| 1,536,807 | Meuser | May 5, 1925 |
| 1,929,409 | Carr | Oct. 10, 1933 |
| 2,129,851 | Lee | Sept. 13, 1938 |
| 2,219,249 | Blagden et al. | Oct. 22, 1940 |
| 2,273,171 | Bennett | Feb. 17, 1942 |
| 2,325,731 | Arentzen et al. | Aug. 3, 1943 |
| 2,336,715 | Casler et al. | Dec. 14, 1943 |
| 2,359,123 | Krapf | Sept. 26, 1944 |
| 2,359,889 | Bigelow | Oct. 10, 1944 |
| 2,360,282 | Russell | Oct. 10, 1944 |
| 2,372,475 | Doberstein | Mar. 27, 1945 |
| 2,381,109 | Cartlidge | Aug. 7, 1945 |
| 2,386,619 | Long et al. | Oct. 9, 1945 |
| 2,426,980 | Ball | Sept. 9, 1947 |
| 2,472,860 | Russell | June 14, 1949 |
| 2,488,520 | Beck | Nov. 22, 1949 |
| 2,507,341 | Lee | May 9, 1950 |
| 2,543,519 | Baechli | Feb. 27, 1951 |
| 2,558,470 | Vandermark | June 26, 1951 |
| 2,592,532 | Beck | Apr. 15, 1952 |
| 2,609,116 | Beck | Sept. 2, 1952 |